US008959420B1

(12) United States Patent
Piszczek et al.

(10) Patent No.: US 8,959,420 B1
(45) Date of Patent: Feb. 17, 2015

(54) DATA STORAGE SYSTEM AND METHOD FOR DATA MIGRATION BETWEEN HIGH-PERFORMANCE COMPUTING ARCHITECTURES AND DATA STORAGE DEVICES USING MEMORY CONTROLLER WITH EMBEDDED XOR CAPABILITY

(71) Applicant: DataDirect Networks, Inc., Chatsworth, CA (US)

(72) Inventors: Michael J. Piszczek, Laurel, MD (US);
Jason M. Cope, Columbia, MD (US);
William J Harker, Columbia, MD (US);
Pavan Kumar Uppu, Laurel, MD (US);
Thomas E. Fugini, Mt. Airey, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 191 days.

(21) Appl. No.: 13/719,750

(22) Filed: Dec. 19, 2012

(51) Int. Cl.
*G06F 11/00* (2006.01)
*H03M 13/00* (2006.01)
*G06F 12/02* (2006.01)
*H03M 13/05* (2006.01)

(52) U.S. Cl.
CPC .............. *G06F 12/02* (2013.01); *H03M 13/05* (2013.01)
USPC .......................... 714/801; 714/6.22; 714/6.24

(58) Field of Classification Search
CPC . G06F 12/0246; G06F 12/00; G06F 11/1048; G06F 3/0688; G06F 13/1657; G06F 13/1694; G06F 5/065; G06F 11/10; G06F 11/1076; G06F 2212/7203; G06F 3/0646; G06F 3/0655; G06F 3/0656; G06F 3/0658; G06F 5/10; G06F 9/00; G06F 11/073; G06F 11/0766; G06F 11/1092; G06F 2211/1054; G06F 12/16; G06F 2211/1009; G06F 3/0689
USPC ........... 714/763, 819, 736, 5.11, 6.24, 805, 1, 714/6.2, 6.22, 800, 801; 711/E12.001, 100, 711/114
See application file for complete search history.

(56) References Cited

U.S. PATENT DOCUMENTS

| 5,386,383 | A | * | 1/1995 | Raghavachari | .......... 365/189.05 |
| 5,522,065 | A | * | 5/1996 | Neufeld | ....................... 714/6.12 |
| 6,151,641 | A | * | 11/2000 | Herbert | ........................... 710/22 |
| 7,031,987 | B2 | * | 4/2006 | Mukkamalla et al. | ................ 1/1 |
| 7,127,668 | B2 |  | 10/2006 | McBryde et al. |  |
| 7,721,165 | B2 | * | 5/2010 | Tamura et al. | ................. 714/718 |
| 7,877,669 | B2 | * | 1/2011 | Eggleston et al. | ............. 714/764 |
| 8,738,866 | B2 | * | 5/2014 | Sonoda et al. | ................ 711/154 |
| 8,799,747 | B2 | * | 8/2014 | Goss et al. | ..................... 714/773 |
| 2010/0011261 | A1 | * | 1/2010 | Cagno et al. | .................. 714/719 |

* cited by examiner

*Primary Examiner* — Phung M Chung
(74) *Attorney, Agent, or Firm* — Rosenberg, Klein & Lee

(57) ABSTRACT

The present data storage system employs a memory controller with embedded logic to selectively XOR incoming data with data written in the memory to generate XOR parity data. The memory controller automatically performs XOR operations on incoming data based upon the address range associated with the memory "write" request. The system provides data migration and parity generation in a simple and effective manner and attains reduction in cost and power consumption. The memory controller may be built on the basis of FPGAs, thus providing an economical and miniature system.

32 Claims, 13 Drawing Sheets

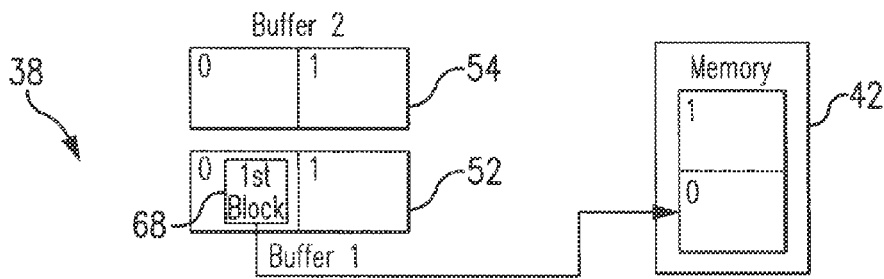
FIG. 7A
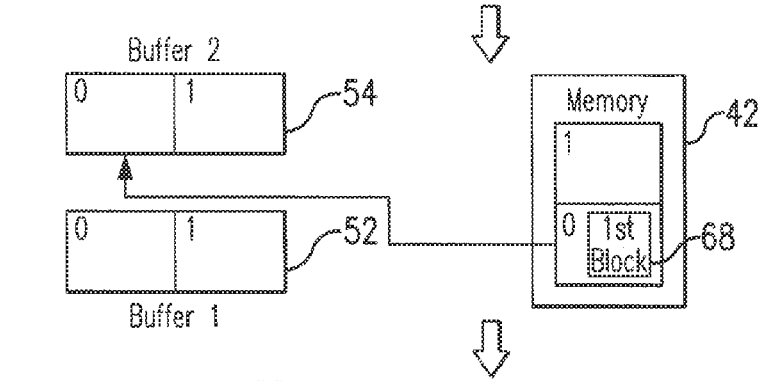
FIG. 7B
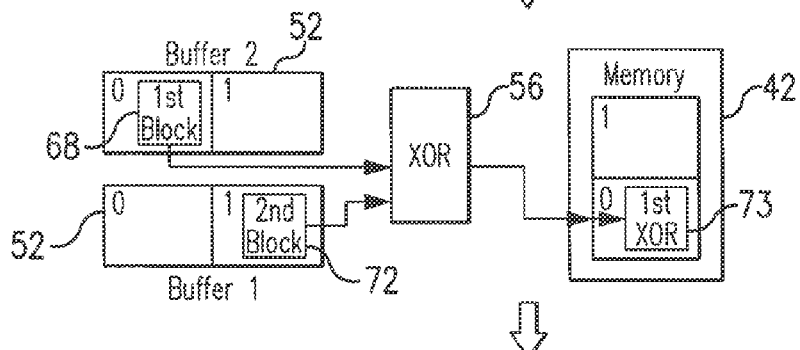
FIG. 7C
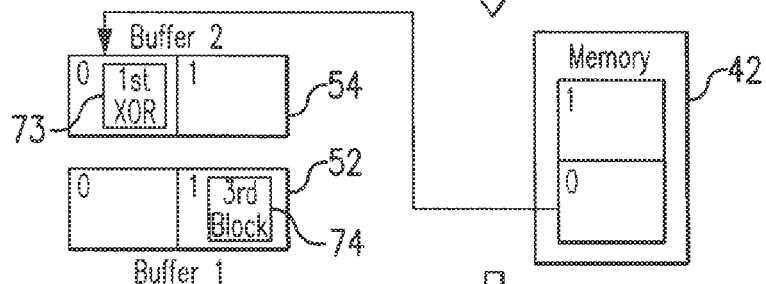
FIG. 7D
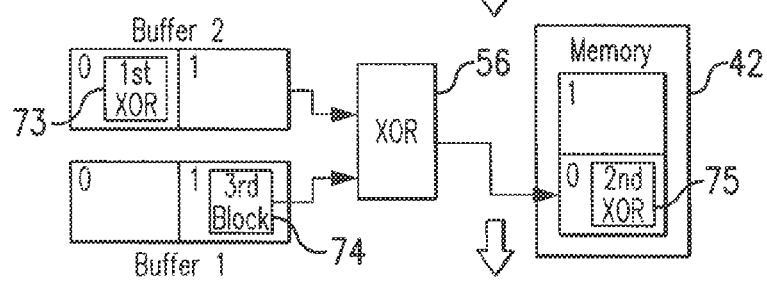
FIG. 7E
continued to
FIG. 7F continued from

DATA STORAGE SYSTEM AND METHOD FOR DATA MIGRATION BETWEEN HIGH-PERFORMANCE COMPUTING ARCHITECTURES AND DATA STORAGE DEVICES USING MEMORY CONTROLLER WITH EMBEDDED XOR CAPABILITY

FIELD OF THE INVENTION

The present invention is directed to data storage systems, and in particular to a system and method based on RAID (Redundant Array of Independent Disks) principles for data migration between high-performance computing cluster architectures (data generating entities) and data storage devices, such as data storage disks and/or solid-state storage devices.

More in particular, the present invention is directed to a data storage system employing the memory controller which automatically performs XOR operations on incoming data based upon an address range associated with the memory "write" request.

In overall concept, the present invention is directed to a data storage system and method with increased data fault tolerance implemented through embedding logic into a memory controller to selectively apply XOR calculations to incoming data and cumulatively recorded parity data from previous data blocks, with the goal to generate XOR parity data for a "write" data stripe.

In addition, the present invention is directed to a method and system for data storage where hosts (high-performance computing cluster architectures) send "write" data requests to storage devices through a PCIe switch, where each block of the "write" data stripe is mirrored and passes to the memory controller with embedded XOR capability (further referred to herein also as an XOR memory controller) which writes the data into the memory and into a buffer provided in the XOR memory controller using an initial address range. Subsequent blocks of data in the data stripe to be XOR-ed are written into the buffer in the XOR memory controller using another address range with addresses which are offset from the initial "write" address. Upon receipt of subsequent data blocks, the preceding calculated parity block is requested from the memory for being XOR-ed with the subsequent data block, and the new XOR result is written back to the memory. The procedure continues until the entire data stripe is processed, and the XOR parity data is generated for the full stripe of data.

The present invention is also directed to a simplified and inexpensive data storage system which eliminates the use of an expensive CPU (Central Processor Unit) or GPU (Graphics Processor Unit), and which merges the XOR capability of an RAID engine into a memory controller for efficient XOR parity data generation.

Further, the present invention is directed to a data storage system leveraging inexpensive and power-saving FPGA (Field-Programmable Gate Array) technology which, being used in conjunction with broadcast capabilities of PCIe switches, permits the performance of RAID operations in a highly efficient manner, i.e., with no copies needed. The memory buffer unit embedded inside the FPGA performs the XOR "write" operation at the same speed as a "read" operation.

The present invention is further directed to a data storage system which uses a memory management technique for mapping virtual memory to a physical memory in a manner permitting the presentation of a logical address range twice the size of the physical memory's address range by sharing it between competing operations, for example, a "write" vs. "XOR write". One half of the presented address range corresponds to conventional read/write operations, while writing to the other half of the address range automatically implies an "XOR write" operation. The distinction between performing a conventional "write" vs. an "XOR write" on the same physical memory location is determined by which half of the mapped virtual memory is accessed.

The present invention is also directed to a data storage system based on RAID principles, in which the memory controller is integrated with logic functions such as XOR, OR, AND, NOR, NAND, and math functions, such as ADD and SUBTRACT, etc.

BACKGROUND OF THE INVENTION

Computer systems generally employ data storage devices, such as disk drive devices, or solid-state storage devices, for storage and retrieval of large amounts of data. Usually the data storage devices are arranged in an array. The most common type of a storage device array is the RAID (Redundant Array of Inexpensive (Independent) Drives). The arrays of solid-state storage devices such as flash memory, phase change memory, memristors, or other non-volatile storage units, can also be used in data storage systems operating in accordance with RAID principles.

The RAID uses several inexpensive drives with a total cost which is less than the cost of a high-performance drive to obtain a similar performance with greater security. RAIDs use a combination of mirroring and/or parity for providing greater protection from lost data. For example, in some modifications of the RAID system, data is interleaved in stripe units distributed with parity information across all of the disk drives. The parity scheme in the RAID utilizes either a two-dimensional XOR algorithm or a Reed-Solomon Code in a P+Q redundancy scheme.

The main concept of the RAID is the ability to virtualize multiple drives (or other storage devices) in a single drive representation. A number of RAID schemes have evolved, each designed on the principles of aggregated storage space and data redundancy. There are five standard RAID levels originally conceived, but many more operations have evolved. Most commonly used RAID levels include:

RAID 0 which provides a block-level striping without parity or mirroring, which has no redundancy.

In RAID 1, which uses mirroring without parity or striping, data is written identically to two drives, thereby producing a mirrored set. "Read" request is serviced by either of the two drives containing the requested data, and a "write" request of data is written to both the drives.

In RAID 10, which uses mirroring and striping, data is written in stripe across the primary disk and then mirrored to the secondary disks.

In RAID 2 level, which is based on bit level striping with dedicated Hamming-code parity, rotations of all disks are synchronized, and data is striped such that each sequential bit is on a different drive.

In RAID 3 level, which is based on byte-level striping with dedicated parity, disks rotations are synchronized, and data is striped so each sequential byte is on a different drive. Parity is calculated across corresponding bytes and stored on a dedicated parity drive.

RAID 4, employs block-level data striping with dedicated parity. RAID 4 data distribution across drives is similar to RAID 3, but the granularity of the distributed data in RAID 4 (block-level) is coarser than that employed by RAID 3 (byte-level). In this setup, files may be distributed between multiple drives. Each drive operates independently, allowing I/O requests to be performed in parallel.

RAID 5 uses block-level striping with distributed parity and distributes parity along with the data and requires all drives, but one, to be present to operate. The array in this arrangement is not destroyed by a single drive failure. Upon drive failure, any subsequent reads can be calculated from the distributed parity such that the drive failure is masked from the end user.

RAID 6 level uses block-level striping with double distributed parity, and tolerates up to two concurrent drive failures.

An example RAID-5 storage device is illustrated in FIG. 1. In this example device, user data is aggregated into four stripes consisting of several blocks (blocks $A_1$, $B_1$, $C_1$, $D_1$, $A_2$, . . . ). Each stripe also includes dedicated parity blocks (blocks $A_p$, $B_p$, $C_p$, and $D_p$) generated from the user data and a parity generation algorithm (such as an XOR scheme). Stripes are spread across all hard drives so that each drive absorbs one block from each stripe (either a parity block or data block). In this example, the parity block placement is shifted between stripes so that the parity data is distributed among all the drives. Each stripe block per drive can vary in size, for example, from 4 KB to 256 KB per stripe. The data block size can be modified during device setup or configuration to adjust performance.

Parity data allows RAID storages device to reconstruct lost or corrupted data. In the example illustrated in FIG. 1, the RAID can recover from a failure of Disk 1 by using the accessible user and parity data on Disk 0, Disk 2, and Disk 3 to reconstruct the lost data on Disk 1. For example, the RAID device uses data in blocks $A_1$, $A_3$, and $A_p$ to reconstruct lost block $A_2$.

Parity blocks are usually computed using the Exclusive OR (XOR) on binary blocks of data. An XOR comparison takes two binary bits, represented as "0" and "1", compares them, and outputs an XOR result of "zero" or "one". The XOR engine returns a "1" only if the two inputs are different. If both bits are the same, i.e., both "0"s or both "1"s, the output of the XOR engine would be "0".

For example, as shown in Table 1:
for stripe 1, the XOR parity block may be placed in Drive 4,
for stripe 2, the XOR parity block may be placed in Drive 3,
for stripe 3, the XOR parity block may be placed in Drive 2, and
for stripe 4, the XOR parity block may be placed in Drive 1.

TABLE 1

|  | Drive 1 | Drive 2 | Drive 3 | Drive 4 |
| --- | --- | --- | --- | --- |
| Stripe 1 | 0100 | 0101 | 0010 | 0011 |
| Stripe 2 | 0010 | 0000 | 0110 | 0100 |
| Stripe 3 | 0011 | 0001 | 1010 | 1000 |
| Stripe 4 | 0110 | 0001 | 1101 | 1010 |

The parity blocks are computed by running the XOR comparison on each block of data in the stripe. It means that the first two blocks are XOR-ed, then the result is XOR-ed against the third block, and the XOR comparison continues for all drives in the array, except for the block where the parity is stored.

Current RAID engines generally use a CPU with a DMA (Direct Memory Access) capability attached to a large memory to perform XOR operations to generate parity. Typically, data to be striped across a set of drives is first written into the memory buffer of the CPU. The CPU then reads the data back in chunks (blocks) and calculates the XOR of the data to generate parity. The parity XOR data is then written back to the memory, and subsequently is "flashed" to the disks. This method requires all of the data to be buffered in the memory of the CPU.

Referring to FIG. 2 representing a typical RAID engine using a CPU, a host 10 sends a "write" data request to storage devices 12. The data is first written to a memory 14 attached to the CPU 16. In this arrangement, the data is sent to a PCIe switch 18 which forwards it to the CPU 16 which, in turn, passes the data into the memory 14. A memory controller 20 within the CPU 16 controls data writing to and reading from the memory 14.

The CPU 16 reads the data from the memory 14, performs an XOR of the data, and then writes the computed parity back into the memory 14. The CPU 16 then instructs the storage devices 12 to read the data and parity from the memory 14, and store the data.

In this arrangement, all of the data is buffered in the memory 14, thus requiring an overly fast transfer rate of the data in the memory interface. This scheme requires the memory interface to the CPU to be greater than 3× faster than the transfer array of data.

In addition, the reliance of the XOR operation in this arrangement on an expensive CPU and/or GPU, as well as the need for an additional software to be written for the CPU and GPU operation, results in a complex and expensive scheme, which also has a large footprint and elevated needs for cooling and power consumption.

It is therefore desirable to provide XOR parity data generation in an efficient, inexpensive, and simple manner.

SUMMARY OF THE INVENTION

It is therefore an object of the present invention to provide a data storage system operating in compliance with RAID principles, in which XOR parity data is generated in an efficient and inexpensive way.

It is another object of the present invention to provide a data storage system employing a memory controller with embedded XOR capability (further referred to herein also as an XOR memory controller) for XOR calculations applied to incoming data and the contents of the memory. The XOR memory controller may be integrated with an FPGA (Field-Programmable Gate Array) which may result in lower power consumption and cooling, and have a smaller footprint. In addition, a memory buffer unit resides in the FPGA, which allows for performance of the XOR "write" operations at the same speed as "read" operations.

It is a further object of the present invention to provide a data storage system and method employing an XOR memory controller, which, when used in conjunction with broadcast capabilities of PCIe switches, results in performing RAID operations with zero copies.

It is another object of the present invention to provide a data storage system which employs a memory controller embedded with XOR, OR, AND, NOR, NAND, ADD and SUBTRACT, etc., capabilities.

In addition, it is an object of the present invention to provide a data storage system which merges the XOR capability of a RAID engine into a memory controller to provide efficient XOR parity data generation, where the memory controller automatically performs XOR operations on incoming data based upon an address range associated with the memory "write" request.

In one aspect, the present invention represents a data storage system that comprises a memory controller having at least one embedded XOR logic function unit. The XOR logic function unit includes a first buffer, a second buffer, and an XOR comparator coupled (by inputs thereof) to outputs of the first and second buffers.

A memory unit is coupled to the XOR logic function unit through communication channels extending between the memory unit and the first and second buffers, as well as the output of the XOR comparator, respectively.

The XOR memory controller performs a memory management function to map virtual memory to the physical memory. An Address Decode and Control Unit is included in the XOR memory controller to decode the address associated with the "write" request. The Address Decode and Control Unit uses an extra address line received from PCIe interface to determine what type of "write" operation will be performed. Subsequently, the Address Decode and Control Unit issues a control address signal (extra address line) to perform the needed "write" operation and to place the data Nock in the requested address range.

The XOR memory controller presents a logical (virtual) address range that is twice the size of the physical memory by sharing the virtual memory between competing operations, i.e., for example, "write" vs. "XOR write". This is attained through mapping the physical memory to two virtual memories, where one logical (virtual) mapping to the physical memory is allocated for "read"/"write" operations, while the other virtual mapping provides "XOR write" functions.

The "write" data request received from a host may be represented as a data stripe that includes a plurality "n" of data blocks. The data blocks are sequentially supplied to the XOR memory controller.

The XOR memory controller allocates a first logical memory, i.e., a first virtual (logical) address range and a second virtual (logical) memory, i.e., a second address range, and during the operation, maps the logical memories to the physical memory in accordance with an operation to be performed, i.e., for example, "write" vs. "XOR write."

The XOR memory controller is configured to perform, upon receipt of the "write" request, the following functions:

place a first data block from the "write" data stripe into the first buffer using an address corresponding to a first address range, and transfer the first data block to the memory unit using an address corresponding to the first address range.

Further, the XOR memory controller is configured to:

place a second data block of the "write" data stripe into the first buffer at an address corresponding to the second address range, transmit the first data block from the memory unit into the second buffer, apply XOR logic function to the first data block and the second data block, thereby generating a first XOR result. The first XOR result is placed by the XOR memory controller in the memory unit mapped to the first address range.

The XOR memory controller further places a third data block of the "write" data stripe into the first buffer using an address mapped to the second address range, transmits the first XOR result from the memory unit into the second buffer, applies XOR logic function to the third data block and the first XOR result, thereby generating a second XOR result, and places the second XOR result in the memory unit at an address mapped to the first address range.

The XOR memory controller repeats the procedure for the plurality of subsequent data blocks in the "write" data stripe until all "n" data blocks have been XOR-ed, thereby generating a parity XOR data for the entire "write" data, which is further transmitted to a storage array.

The subject system employs a PCIe switch coupled between the host(s) and the XOR memory controller. The PCIe switch is configured, upon receiving the "write" data request from the host, to transmit the "write" data to the storage array and mirror the same to the XOR memory controller.

The storage array may be built as an array of storage devices, including disk drives or solid-state memory devices, such as, for example, flash memory, phase change memory, memristors, and other non-volatile storage devices.

Preferably, the XOR memory controller includes a plurality of XOR logic function units. In operation, data may be read from the memory unit to the second buffer of one of the plurality of XOR logic function units, while the "write" data may be received from the host at the first buffer of another of the plurality of XOR logic function units. This arrangement provides a highly efficient migration of data through the system with a high write/read rate.

The system further is equipped with a multiplexer coupled between the plurality of XOR logic function units and the memory unit. The multiplexer is configured to transmit the XOR results to the memory unit in a coordinated manner.

An ECC (Error Correction Code) generator unit is coupled between the multiplexer and the memory unit for protecting the XOR results transferred to the memory unit from errors.

An ECC (Error Correction Code) checker unit is coupled between the memory unit and the second buffer for error protection of the XOR data transferred from the memory unit to the second buffer.

The XOR memory controller may be placed at different locations of the Storage Network. For example, alternatively to placing the XOR memory controller in connection with the PCIe switch, the XOR memory controller may be integrated with each of storage devices in the storage array, or with the hosts for pushing data from a host bus adapter.

The memory controller of the present invention may be configured to perform, in addition to the XOR logic function, also the OR, AND, NOR, NAND, ADD and SUBTRACT, etc., capabilities. For this, the XOR engine can be replaced with any other logic engine providing data comparison.

It is another aspect, the present invention constitutes a method for data storage migration which is carried out through the steps of:

embedding an XOR (Exclusive OR) logic function unit into a memory controller, thereby creating an XOR memory controller, where the XOR logic function unit includes a first buffer, a second buffer, and an XOR comparator coupled (by inputs thereof) to the first and second buffers, and coupling the XOR memory controller between at least one host and a memory unit.

The method continues with presenting a logical address range to be twice the size of the physical memory unit, and mapping the virtual memory to the physical memory in a manner permitting sharing the physical memory by competing processes. For this purpose, a memory management unit in the XOR memory controller receives an extra address line to determine what type of the operation is to be performed, and generates a corresponding extra address control signal.

In accordance with the control extra address line, the memory management unit performs mapping between the virtual memory and the physical memory. For example, in the case of competing "write" and "XOR write" operations, corresponding to the same physical address, the "write" is mapped to one virtual memory address range while the "XOR write" is mapped to another virtual memory address range.

Upon receiving a "write" data request from a host, the method continues with the following steps:

(a) placing, under control of the XOR memory controller, a first data block from the "write data stripe into the first buffer using the first address range, (b) transferring, under control of the XOR memory controller, the first data block to the first address range in the memory unit, (c) placing, under control of the XOR memory controller, a second data block from the "write" data stripe into the first buffer using the second address range, (d) transmitting, under control of the XOR memory controller, the first data block from the first address range in the memory unit into the second buffer, (e) applying, under control of the XOR memory controller, XOR logic function to the first data block and the second data block, thereby generating a first XOR result, and (f) placing, under control of the XOR controller, the first XOR result into the first address range in the memory unit, The method further continues by:

(g) placing, under control of the XOR controller, a second data block in the "write" data stripe into the first buffer using the second address range, (h) transmitting, under control of the XOR controller, the first XOR request from the first address range in the memory unit into the second buffer, (i) applying, under control of the XOR controller, the XOR logic function to the second data block and the first XOR result, thereby generating a second XOR result, and (j) placing, under control of the XOR controller, the second XOR result into the first address range in the memory unit.

Further steps of the subject method are carried out through:

(k) repeating, under control of the XOR controller, the steps (g)-(j) for the plurality of subsequent data blocks in the "write" data stripe until all "n" data blocks in the "write" data stripe received from the host have been XOR-ed, thereby generating a parity XOR data for the entire "write" data stripe. Subsequently, a request is sent to the storage array to read the parity XOR data from the memory unit.

The subject method further facilitates data migration by coupling a PCIe switch between the host and the XOR memory controller. The PCIe switch, upon receiving the "write" data request, mirrors the "write" data, and transmits the "write" data to the XOR memory controller and into the data storage array.

Data migration and processing is further facilitated by providing a plurality of XOR logic function units in the XOR memory controller, and, while reading data from the memory unit at the second buffer of at least one of the plurality of XOR logic function units, receiving the "write" data from the host at the first buffer of another of the plurality of XOR logic function units.

A multiplexer is coupled between the plurality of XOR logic function units and the memory unit, facilitating in transmission of the XOR results to the memory unit in a coordinated manner.

An additional error protection is provided through the steps of:

applying ECC procedures to the XOR results transferred from XOR logic function units to the memory unit, and to the XOR data migrating from the memory unit to the second buffer.

These and other objects and advantages of the present invention will be readily available upon reading the following detailed description of the preferred embodiment in conjunction with the drawings figures.

BRIEF DESCRIPTION OF THE DRAWINGS

FIGS. 7A-7G represent a sequence of operations in the process of XOR calculations performed in correspondence to the present invention;

DETAILED DESCRIPTION OF THE INVENTION

Figure 1:
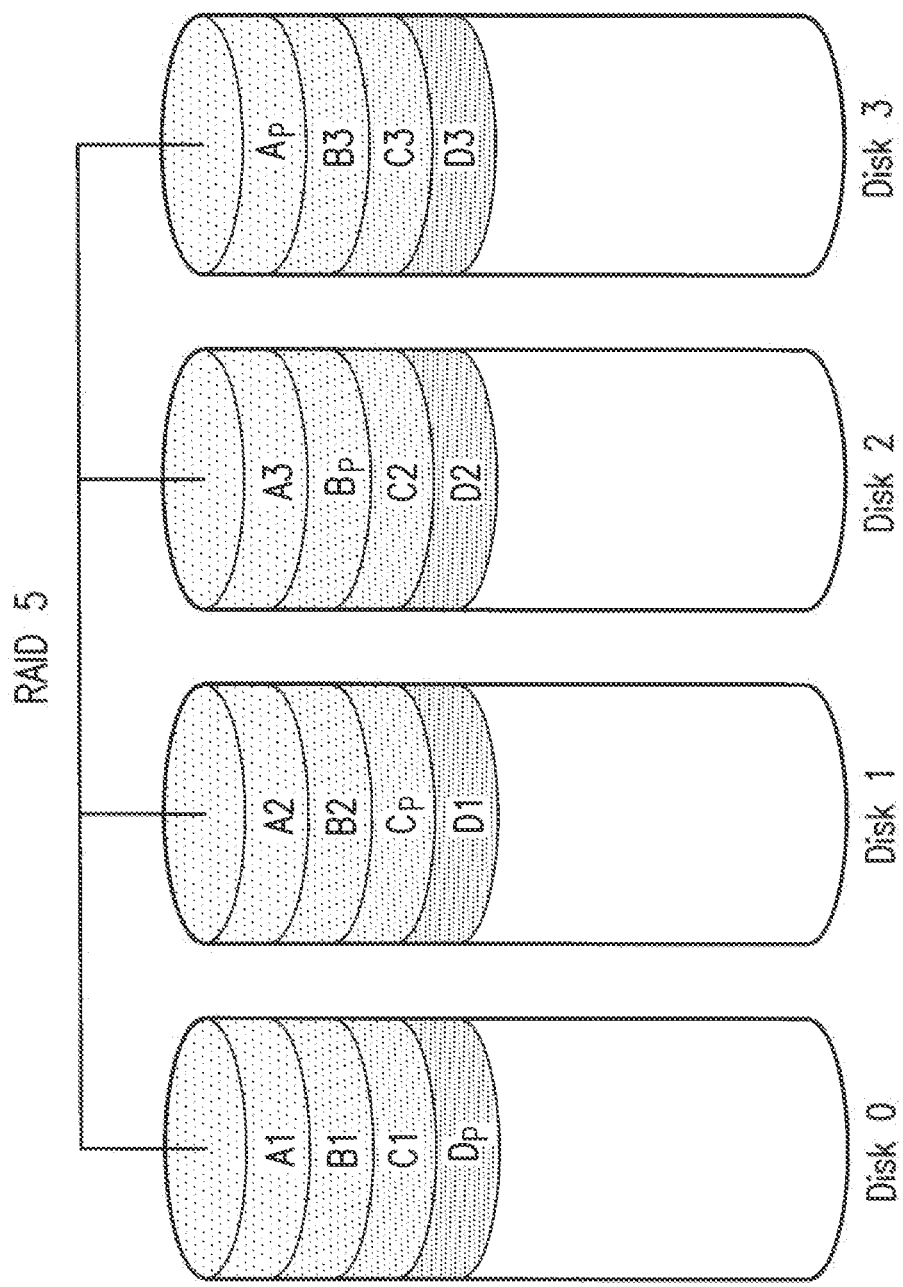
FIG. 1 is a schematic representation of RAID-5 data layout and distribution of the prior art.
Figure 2:
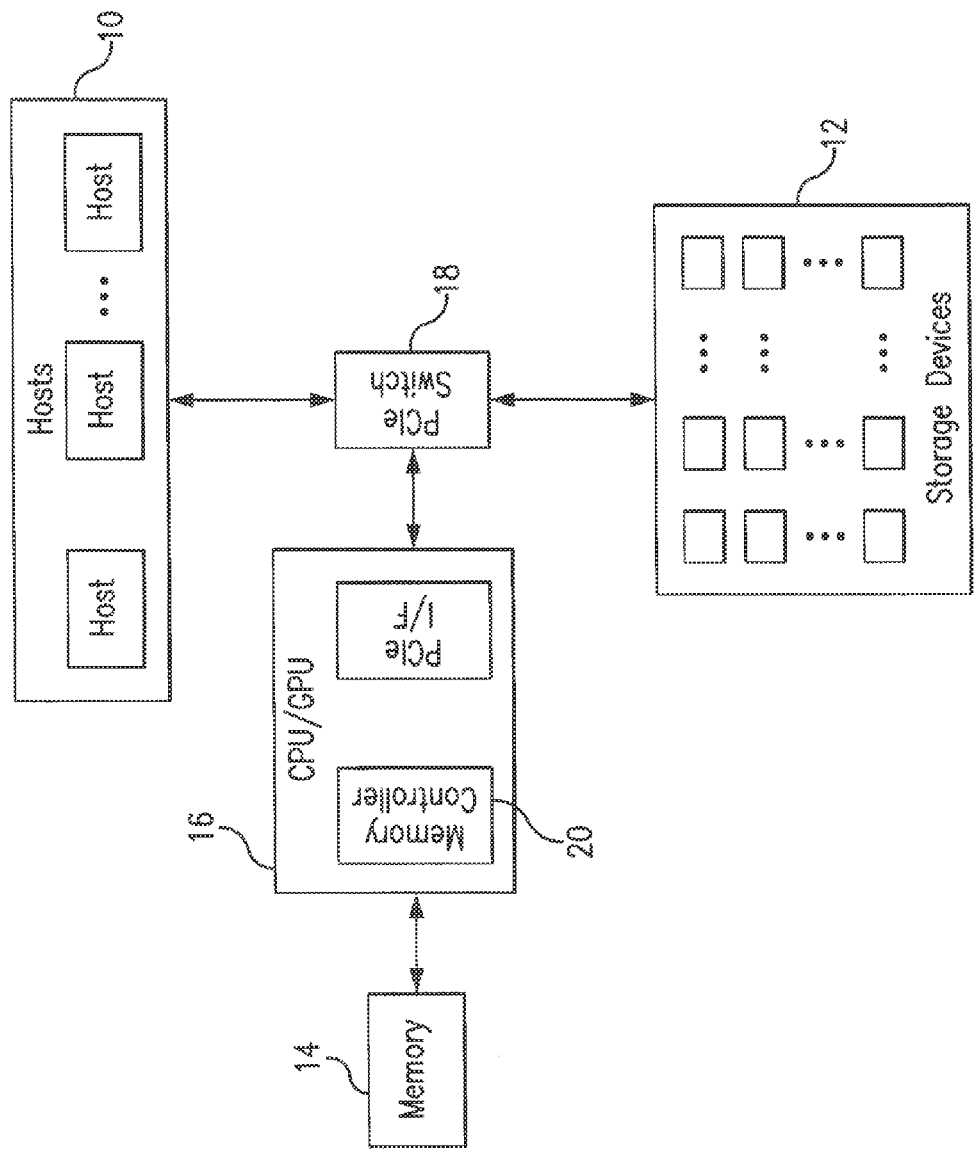
FIG. 2 is a schematic representation of the RAID engine performing XOR operations to generate parity of the prior art.
Figure 3:
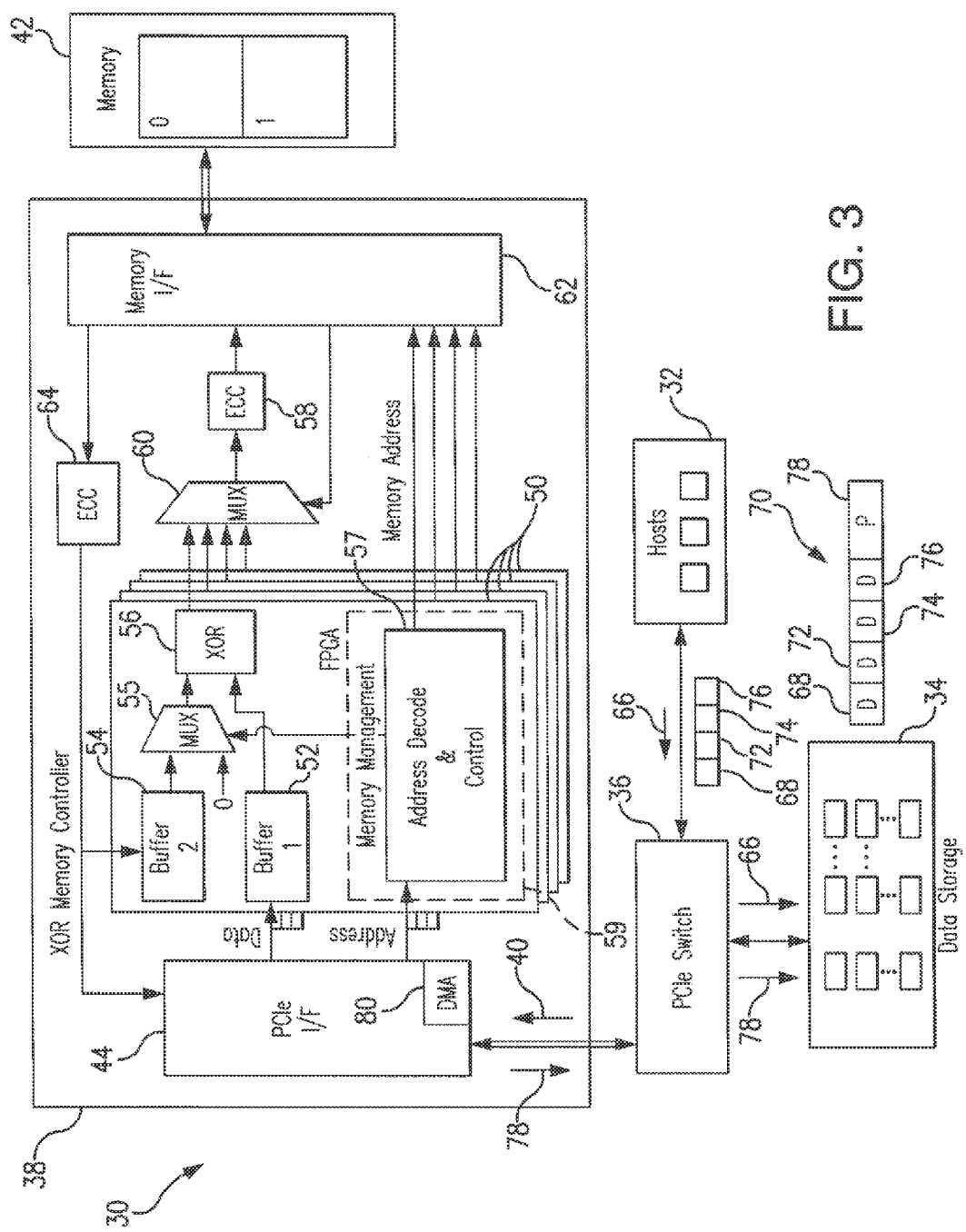
FIG. 3 is a schematic representation of the data storage system using the memory controller with embedded XOR capability of the present invention.

Referring to FIG. 3, the system 30 of the present invention provides data storage for hosts (data generating entities) 32 in an array of storage devices 34. Computer clusters, groups of linked computers, as well as single computers, involved in extended computations, may be linked by a high-speed network that permits sharing of computer resources and memory. Data transfers to and from the computers may be performed through a high-speed PCIe switch bus 36. Any computer within the computer clusters, as well as groups of linked computers, may serve as hosts.

The operation of computer clusters, as well as single computers, i.e. the hosts, requires data writing to and reading from the storage devices. The process of data transfers is carried out during the I/O cycle of the computers. The size of computer clusters and the aggregate I/O bandwidths that are to be supported may require thousands of data storage devices for servicing the computing architecture.

During operation, a virtualized RAID unit engine applies RAID calculations to data ingress from a data generating entity prior to "writing" the data in the storage devices. As a part of the RAID calculations, parity values are calculated for the ingress data. The RAID unit allocates space in the data storage devices for the data (D) and the parity values (P).

The RAID unit also may perform data construction when "read" requests are serviced when corrupted or lost data is found. The parity values are used to construct the data during the read operation.

In order to provide fast and simple generation of XOR parity data, the system 30 of the present invention merges the XOR capability of an RAID engine into a memory controller 38, further also referred to herein as the XOR memory controller. As will be detailed further, the XOR memory controller 38 is designed with the logic engine to selectively XOR incoming data 40 with parity data already recorded in a memory unit 42 connected to the XOR memory controller 38. The XOR memory controller 38 employs a PCIe interface 44 for fast data access.

The memory controller 38 automatically performs XOR operations on incoming data 40 based upon the address range associated with the memory "write" request received from a host 32.

The memory controller 38 is adapted to control the flow of data to and from the memory 42 of any type, including, but not limited to, DDR (Double Data Rate), Static Random Access Memory (SRAM), Flash memory, etc.

For example, being adapted for the DDR memory, the memory controller 38 permits twice the data to be transferred without increasing the memory clock rate or increasing the bandwidth of the memory interface 62.

When operating as a SRAM memory controller, the subject system attains an improved SRAM bandwidth (due to the use of inverters for driving bit lines), higher speed of operations (due to the acceptance of all address bits at a time), and easily detectable small voltage swings (due to differential signaling permitted by the symmetric structure of SRAMS).

Flash memory also may be used as a part of the DRAM (Dynamic Random Access memory) unit 42. Although operating somewhat slower than the conventional DRAM, the operation with the Flash memory uses much less power and is significantly cheaper.

The memory controller 38 is equipped with a Memory Management Unit that executes the mapping between the virtual memory and the physical memory in the subject system in a manner that presents a memory address range on the PCIe bus 36 twice the actual size of the attached external memory 42. This allows the memory 42 to be mapped as a device that is 2× its actual size thereof, where the lower (0) address range 46 in the virtual memory allows for conventional "read" and "write" operations, i.e., at a normal speed. The second address range (1) 48 in the virtual memory is allocated for "XOR writes" at the normal speed. This arrangement permits the efficient servicing of competing processes, i.e., for example, when the XOR memory controller 38 has to read the data from the memory 42 in order to XOR data with the incoming data, and then write the data to the memory 42, as will be detailed in further description.

A logical (virtual) address is the address at which an item (memory cell, storage element, network host) appears to reside from the perspective of an executing application program. The logical address can only indicate a memory location of the data but is not directly associated with it.

A logical address may be different from the physical address. A memory management unit 59 in the memory controller 38 provides the function of the virtual memory mapping to the physical memory, i.e., the address translation between logical address and the physical address.

The physical address of the memory unit 42 may be mapped to different logical addresses for various purposes. In the subject system, the same physical memory address may appear at two different logical addresses, for example, for different types of operations, thus attaining the logical memory that is twice the size of the physical memory.

In the present system, the memory controller 38 maps the physical memory to two logical address ranges (0 and 1), i.e. the virtual address range 46 and 48 respectively, to facilitate sharing of the physical memory between competing processes as they need it. A "write" to each virtual memory address range (46 or 48) may be mapped to the same underlying physical address range, but the memory controller logically "separates" the requested "write" and "XOR write" processes.

Figure 4:
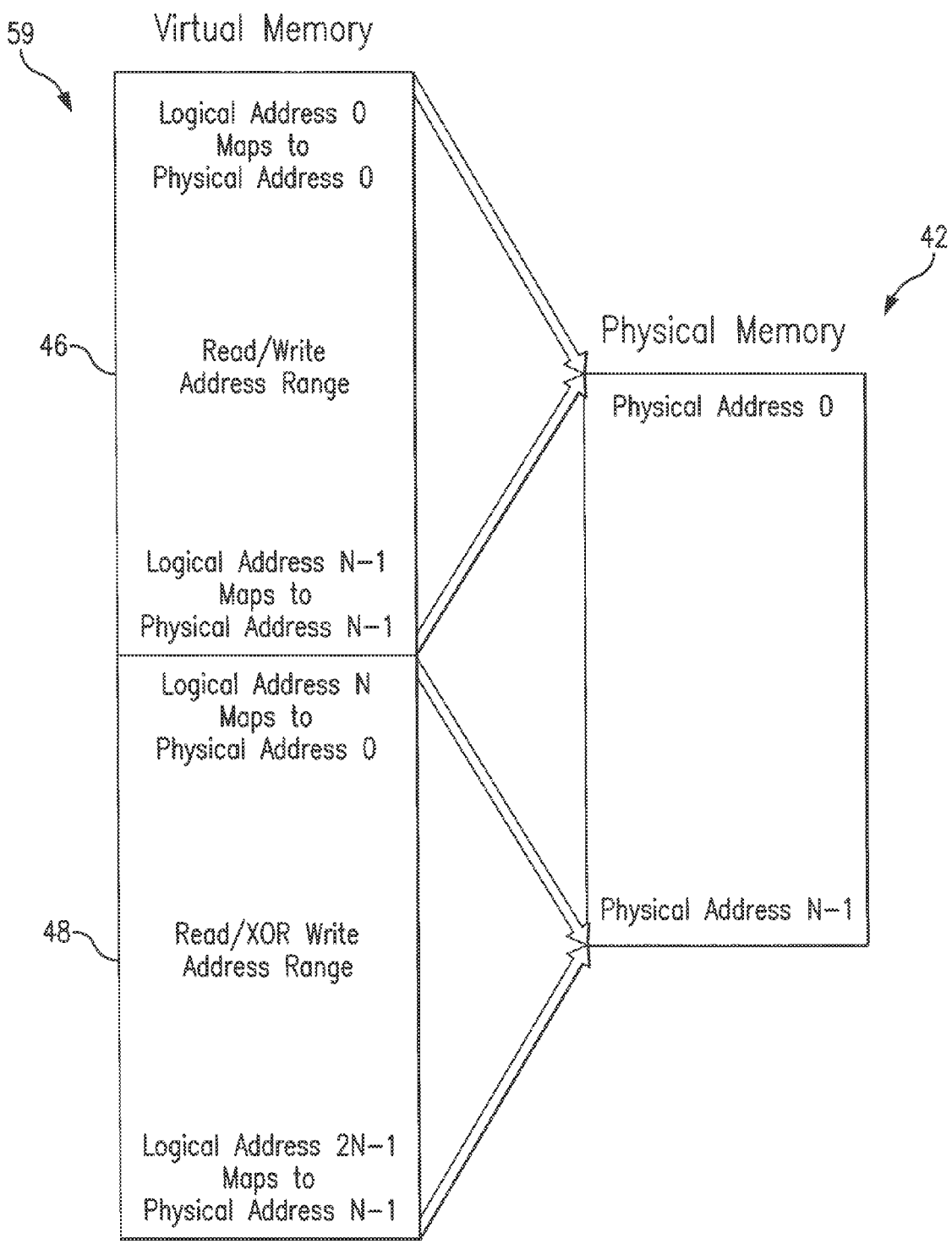
FIG. 4 illustrates the principles of mapping of logical memory addresses to their physical counterparts in the system of the present invention.

To illustrate the "logical separation" concept for the competing processes, i.e., for example, "write" vs "XOR write", FIG. 4 shows, for example, that the competing "write" and "XOR write" operations corresponding to different virtual address ranges 46 and 48, respectively, may be mapped to the same physical address, as long as different types of operations are performed.

The "write" operation to the logical address 0 (in the virtual address range 46) is mapped to physical address 0, and the "XOR write" operation to the logical address N (in the virtual address range 48) is mapped to the physical address 0 (the same physical address as the competing "write" operation).

Similarly, the "write" operation to the logical address N−1 (in the virtual address range 46) maps to the physical address N−1, and the "XOR write" operation to the logical address 2 N−1 (in the virtual address range 48) maps to the physical address N−1 (the same physical address as the competing "write" operation).

The Address Decode and Control Unit 57, which is a part of the Memory Management Unit 59, shown in FIG. 3, uses an extra address line received over the PCIe interface 44 from the host to determine what type of "write" operation is to be performed. Subsequently, the Address Decode and Control Unit 57 generates a control signal that, in the format of the extra address line, is forwarded to the Multiplexer 55. Depending on the type of the operation requested, the memory controller 38 performs the mapping between the virtual and physical memories.

The XOR memory controller 38 includes multiple copies of the XOR logic function units 50 each of which includes buffers 52 and 54, and the XOR engine 56. The XOR engine 56 applies XOR computations to the data contained in buffers 52 and 54, and the results of the calculation are transferred to the memory 42.

Each copy 50 of the XOR logic function unit also includes an Address Decode and Control Unit 57 that is connected to the PCI interface (I/F) 44 for interception of the "write" data requested address.

The Address Decode and Control Unit 57 is coupled by its output, to a Multiplexer 55, to be further described.

An ECC (Error Correction Code) generator 58 is coupled between the XOR logic function units 50 (through the Multiplexer 60) and the memory interface 62. An ECC (Error Correction Code) checker 64 is coupled between the memory interface 62 and the PCIe interface 44, as well as between the memory interface 62 and the buffer 54. Both the ECC generator 58 and ECC checker 64 are configured to protect data migrating therethrough by checking for errors and, when necessary, correcting "on the fly".

The design and operational principles of the ECC generator and ECC checker are known to those skilled in the art, and are not detailed herein. The data protection provided by the ECC generator and ECC checker increases the reliability of the subject storage system practically without extra cost. As an example, Reed-Solomon Codes may be implemented which are able to detect and restore "erased" bits, as well as incorrect bits.

The multiplexer 60 facilitates data migration between the plurality of the XOR logic function units 50 and the memory 42 through coordinating parallel reading, writing and processing data in different XOR logic function units.

Each of the XOR logic function unit 50 may be integrated with an FPGA for further improving the performance characteristics, costs and power consumption, as well as the scale of miniaturization of the present system.

Referring to FIGS. 3-4, and 6A-6B, the hosts 32 send "write" data 66 (in the form of a data stripe 70 split into various data blocks 68, 72, 74, 76, based on the RAID protection scheme chosen) to the storage devices 34 through the PCIe switch 36.

The host requests to write the first block 68 to the storage devices. As the data passes through the PCIe Switch, it is mirrored to the XOR Memory Controller 38 using Address Range 0. The PCIe switch will mirror subsequent data blocks 72, 74 and 76, when requested by the host to be written to the storage devices, during the transfer using Address Range 1.

The XOR memory controller receives the data 40 on a PCIe interface 44, and writes the data into the buffer 52.

The Address Decode and Control Unit 57, upon intercepting the Address of the ingress data, decodes based on Address Range 0 or Address Range 1, and provides correct control signals to the Multiplexer (MUX) 55.

Figure 5:
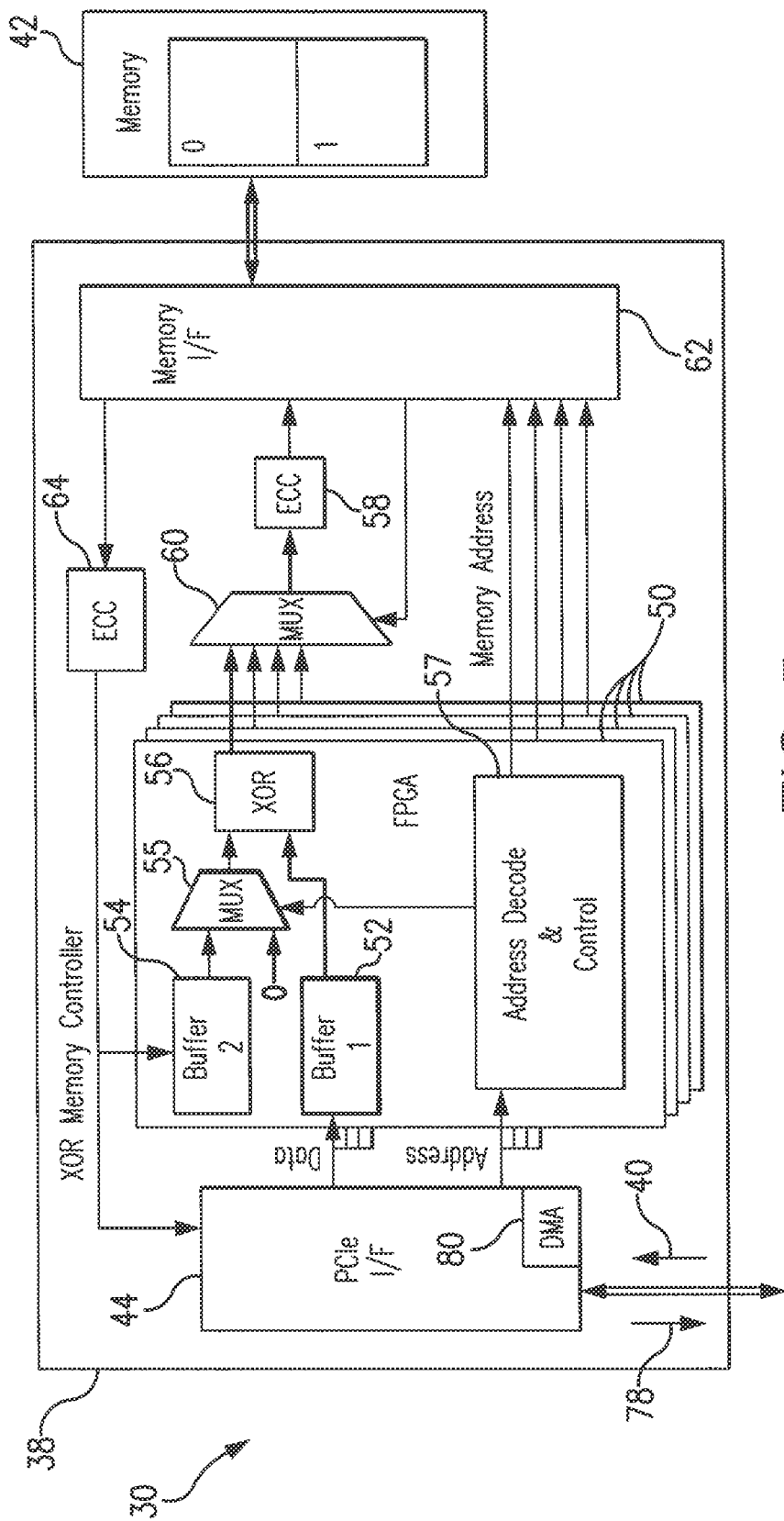
FIG. 5 is a schematic representation of the XOR memory controller of the present invention illustrating the data flow path during the first data block processing.

During the first Data block 68 write, the MUX 55 feeds all ZEROs to the XOR block 56. Data from Buffer 52 will be XOR-ed with all ZEROs and committed to Memory 42 following the highlighted data flow paths shown in FIG. 5.

Figure 6A:
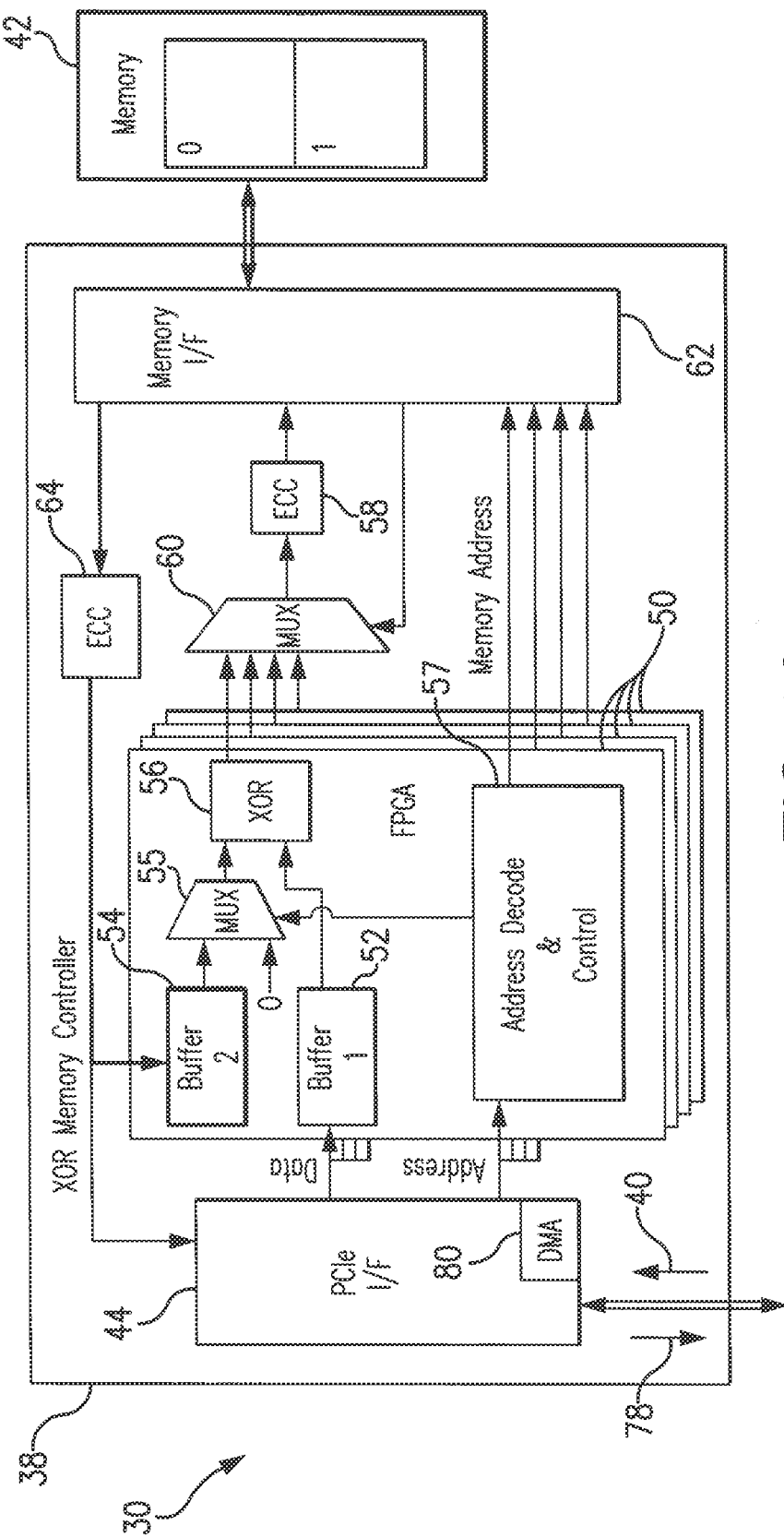
FIG. 6A is a schematic representation of the XOR memory controller of the present invention illustrating the data flow path during the time that data is requested from the memory.

During subsequent data block writes, the previous parity block (XOR result written in the Memory 42), is read from the Memory 42 upon each data block "write" request being received from the host 32. The data block, or the XOR result, is "fetched" from the memory 42, following the highlighted data flow paths to be buffered in Buffer 54, as shown in FIG. 6A.

Figure 6B:
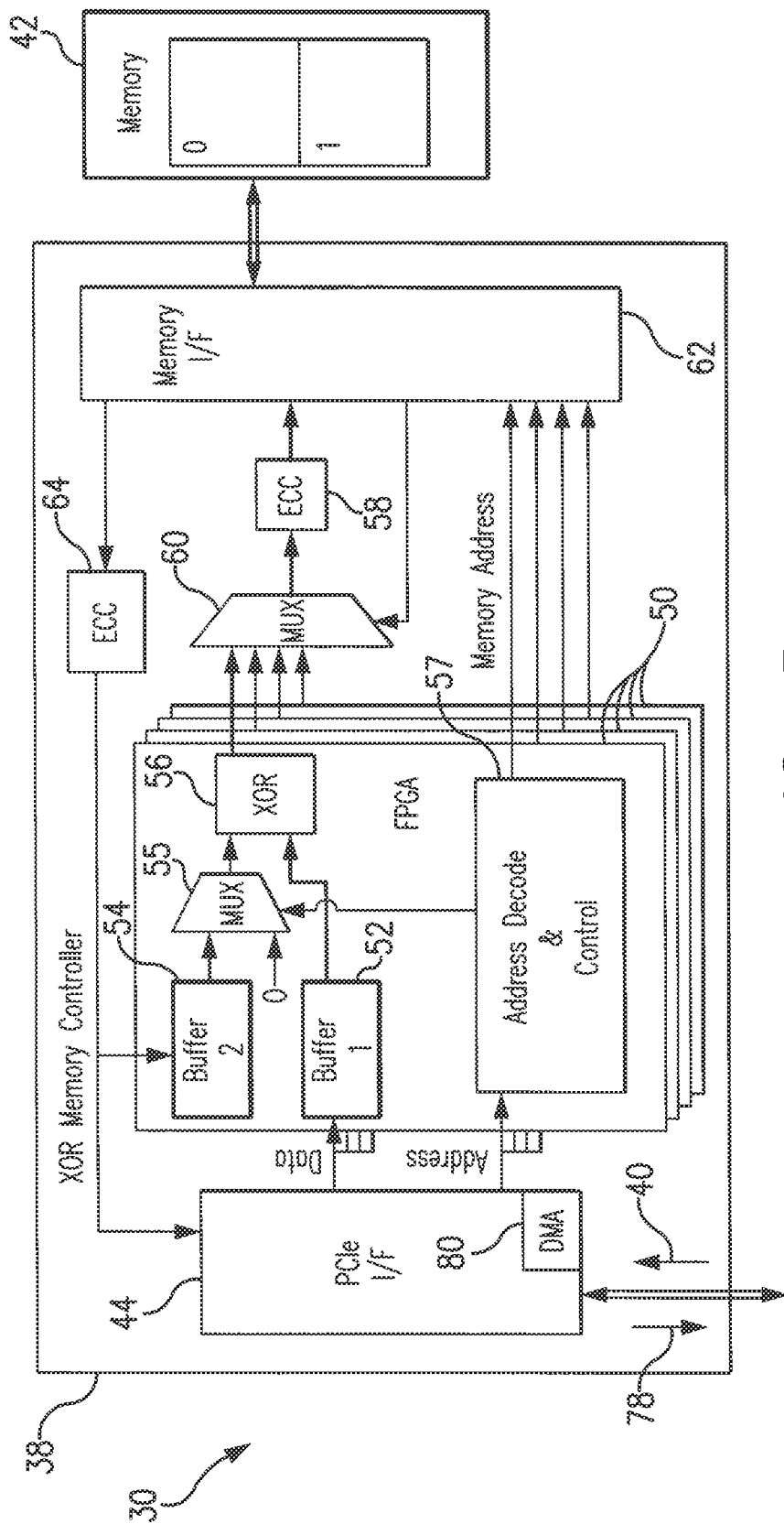
FIG. 6B is a schematic representation of the XOR memory controller of the present invention illustrating the data flow path during the XOR operation.

When the subsequent data block is buffered in Buffer 52, the MUX 55 is signaled to use data from Buffer 52 and Buffer 54 to be XOR-ed using the XOR engine 56, and the resultant XOR result is committed to Memory 42 at the same address the previous data (or previous XOR result) was read from, as depicted by highlighted data flow paths in FIG. 6B. This process is repeated for all data blocks in the "write" request.

When all of the data blocks have been processed in the XOR memory controller, and the XOR parity value has been calculated, the host 32 sends a request to the storage devices 34 to read the parity XOR data from memory 42.

Figure 8:
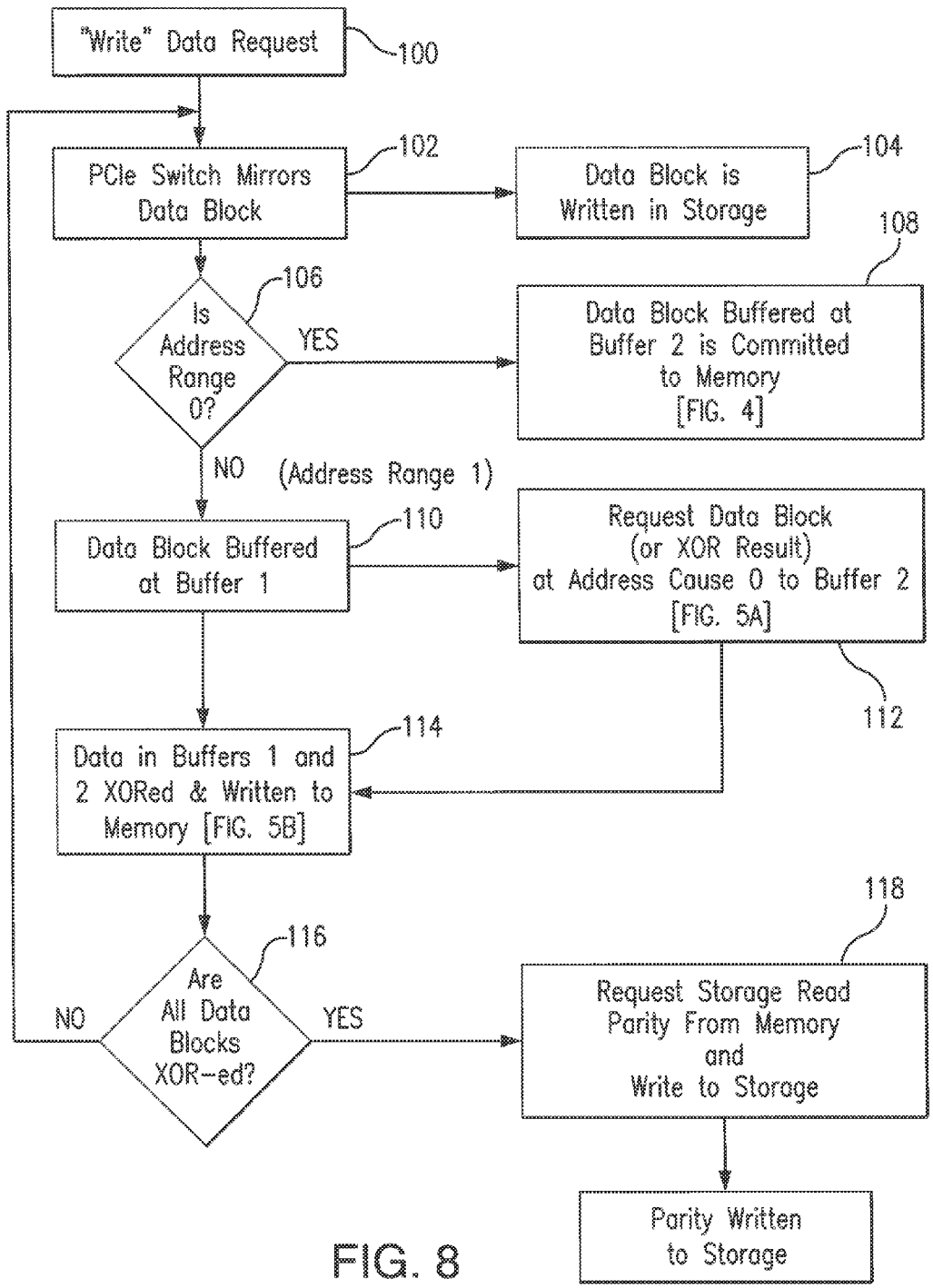
FIG. 8 is a flow-chart diagram representing the method for data migration and processing of the present invention.

Referring to the flow chart diagram of FIG. 8, the data migration including the flow mechanism of the data blocks, creation of parity, and writing of the data and parity to the storage, starts in step 100 with receiving a "write" data request from a host. At this point, responsive to the receipt of the "write" data, the logic flows to step 102, where the PCIe switch mirrors the data block that is transferred to the XOR memory controller. In step 104, the "write" data is forwarded to the storage array.

The "write" data "carries" an address range requested by the host. Upon receipt of the "write" data at the XOR memory controller the procedure follows to logic block 106, where the Address Decode and Control Unit decodes the address request, and issues a corresponding address control signal. In the logic block 106, a decision is made whether the address range requested by the host is "0". If this is the case, the procedure follows to step 108, where the data block buffered at the buffer 52 at the 0 address range, is committed to the memory 42, as best shown in FIG. 7A, and by highlighted paths in FIG. 5.

If, however, in block 106, the decision is made that the address range of the "write" request is "1", the logic follows to step 110, and the data block is buffered at the buffer 52 at the "1" address range, as shown in FIG. 7C.

The logic further proceeds to step 112 to request a data block (or an XOR result) to be transferred from "0" address in memory 42 to the buffer 54, as best shown in FIG. 7B, and by highlighted paths in FIG. 6A.

In the subsequent step 114, data in buffers 52 and 54 are XOR-ed, and the XOR result is written to the memory 42, as best shown in FIG. 7C, and by highlighted paths in FIG. 6B.

From block 114, the procedure follows to the logic block 116, where the decision is made by the host as to whether all data blocks are processed, i.e., the host checks if all "n" blocks of the stripe 70 have been written into the buffer 52 in the address range (1) in the field 48 and XOR-ed into the accumulated parity calculation.

If the entire data stripe 70 has been processed, then the procedure has been completed, and the XOR memory controller 38 completes the PCIe transaction prior to committing the data to the external memory 42.

Figure 7E:
Figure 7F:
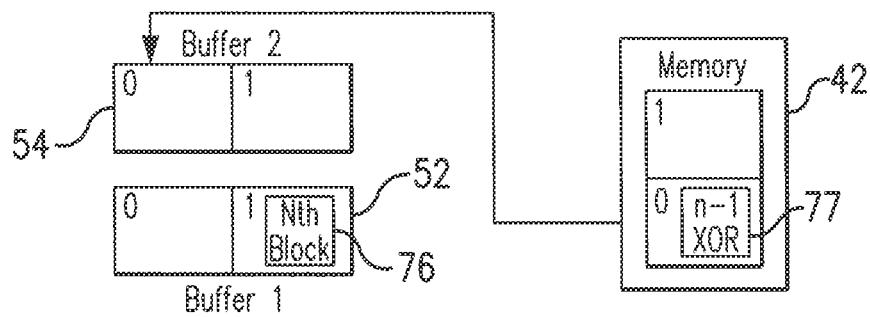
Figure 7G:
Figure 7G:
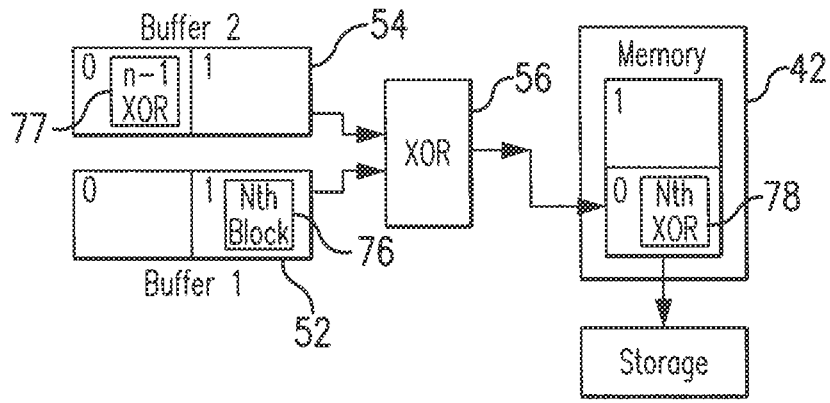

When the entire stripe (all "n" data blocks of the data stripe 70) has been processed, and the XOR operation for the entire stripe 70 has been completed, the host 32 sends a request to the storage device 34 to read the parity XOR data 78 from the memory 42, as shown in FIGS. 3 and 7G.

If, however, there are unprocessed blocks still remaining, the logic loops to step 102.

Referring again to FIG. 3, the "write" data 40 (as well as 66) are received as data stripes 70 which are composed, for example, of data blocks 68, 72, 74 and 76. Parity 78 is to be generated for the blocks 68, 74, 74, and 76 as a part of data fault tolerance provision.

For this purpose (as shown in FIG. 7A), a first block 68 of data of the data stripe is written into the buffer 52 using the address range (0). Upon writing the block 68 into the buffer 52, the data block 68 is committed directly to the external memory 42 without an XOR operation.

Next data block 72 to be XOR-ed is written into the buffer 52 using address range (1) from the field 48, as shown in FIG. 7C. The address (1) for the subsequent writes is offset from the initial write address by ½ the mapped memory size placing them in address range (1) in the field 48.

At this point, the XOR memory controller reads the previously written parity data block 68 from the external memory 42 to the buffer 54, as shown in FIG. 7B, and an XOR operation is then performed by the XOR engine 56 for the data in buffer 52 and buffer 54. The result 73 of the first XOR comparison is written to the address (0) in the external memory 42, as shown in FIG. 7C.

The operation continues for all subsequent data blocks 74 and 76 of the stripe 70. As shown in FIG. 7D, upon writing the third data block 74 in the buffer 52, the first XOR result 73 is "fetched" from the memory 42 into the buffer 54. Subsequently, the XOR calculation is performed on the first XOR result 73 and the third data block 74 (as shown in FIG. 7E) with the following writing of the second XOR result 75 in the memory 42.

As further shown in FIG. 7F, the last data block 76 is written in buffer 52, and the $(n-1)^{th}$ XOR result 77 is transferred from the Memory unit 42 to the buffer 54 for being XOR-ed (as shown in FIG. 7G), thereby generating an XOR parity value 78, which subsequently is transferred to the storage, as shown in FIG. 3, to finalize "write" data migration through the subject data storage system with the parity generation.

The memory interface 62 between the XOR memory controller 38 and the memory 42 is required to be 2× the transfer rate of the PCIe switch to keep the data transfers at full speed. To allow constant data activities on the PCIe bus 36, multiple copies of the XOR logic function units 50 (each containing the buffers 52, 54, the XOR engine 56, address Decode and Control unit 57, and MUX 55) are provided in the subject XOR memory controller 38. While one copy of the unit 50 may read data from the external memory 42 to the buffer 54, another copy of the unit 50 may be receiving host data 40 from the PCIe bus 36 to the buffer 52. The number of XOR logic function units necessary for stable and effective data migration and processing depends upon the data transfer rates of the PCIe bus 36 and the memory interface 62 for the particular application.

Depending upon the location of the XOR memory controller 38 within the storage network, it may be configured to receive data from the hosts 32, or alternatively it may be configured with a DMA controller 80 in order to pull data from the hosts 32.

Figure 9:
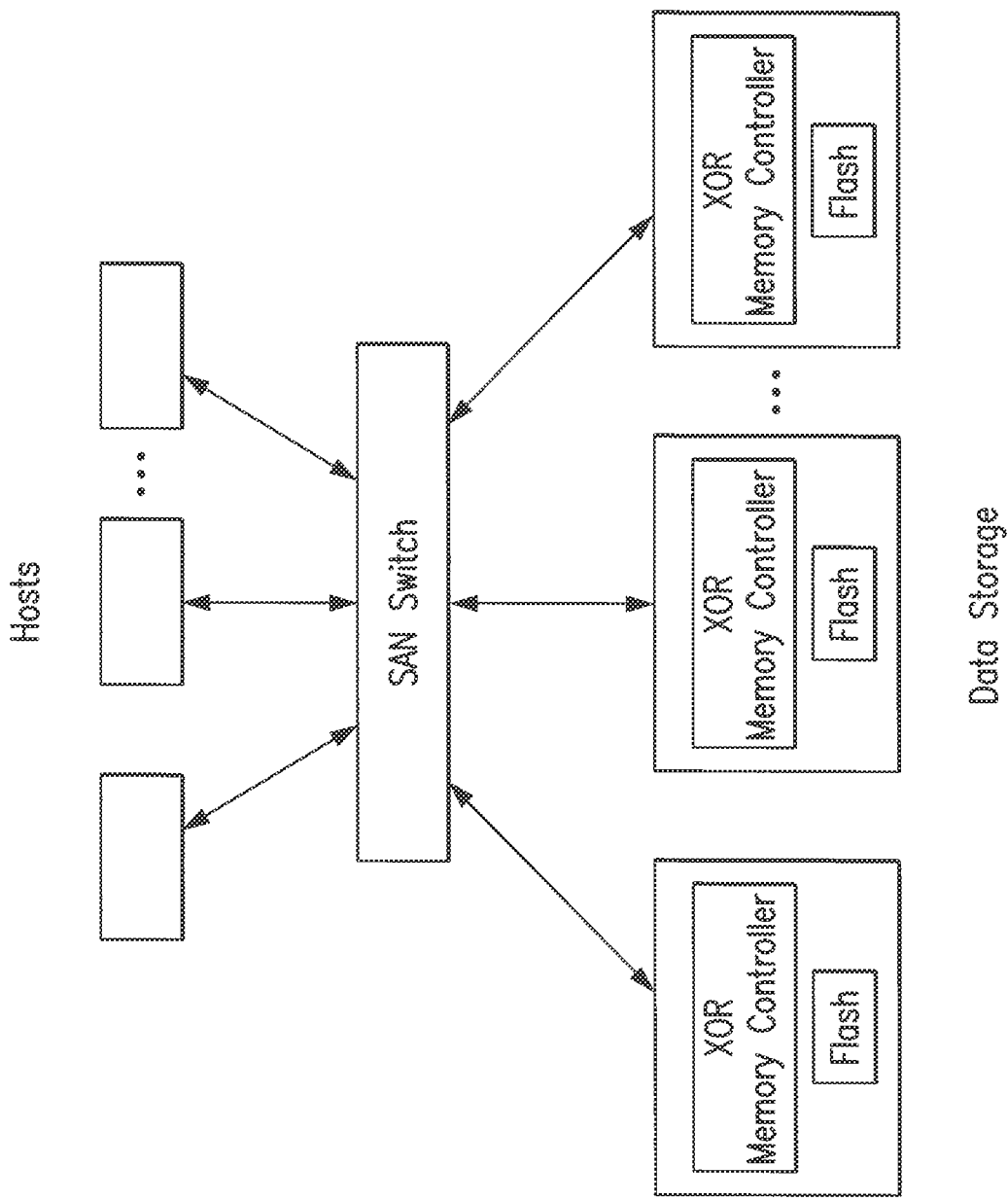
FIG. 9 is an embodiment of the data storage system of the present invention with the XOR memory controller embedded into the storage devices.

Referring to FIG. 9 showing one of the implementations of the current data storage system with XOR memory controller embedded into the storage devices, the host port bandwidths is N, where N is a stripe size, and where storage port bandwidths is N+P, where N is a stripe size, and P is a parity/block size. This embodiment of the data storage system provides for tight integration with flash storage device, phase change memory, memristor, or other non-volatile of storage, and is capable of scaling linearly with the addition of more storage devices.

Referring again to FIG. 3, the XOR memory controller 38 is connected to the PCIe switch 36. In this embodiment the host port bandwidth is N, where N is a stripe size, and the XOR port bandwidth is N+P, where N is a stripe size, and P is a parity/block size, and the storage port bandwidth is P, where P is a parity/block size. This embodiment provides for tight integration with PCIe switch, and works with any type of PCIe storage device that can DMA the data.

Figure 10:
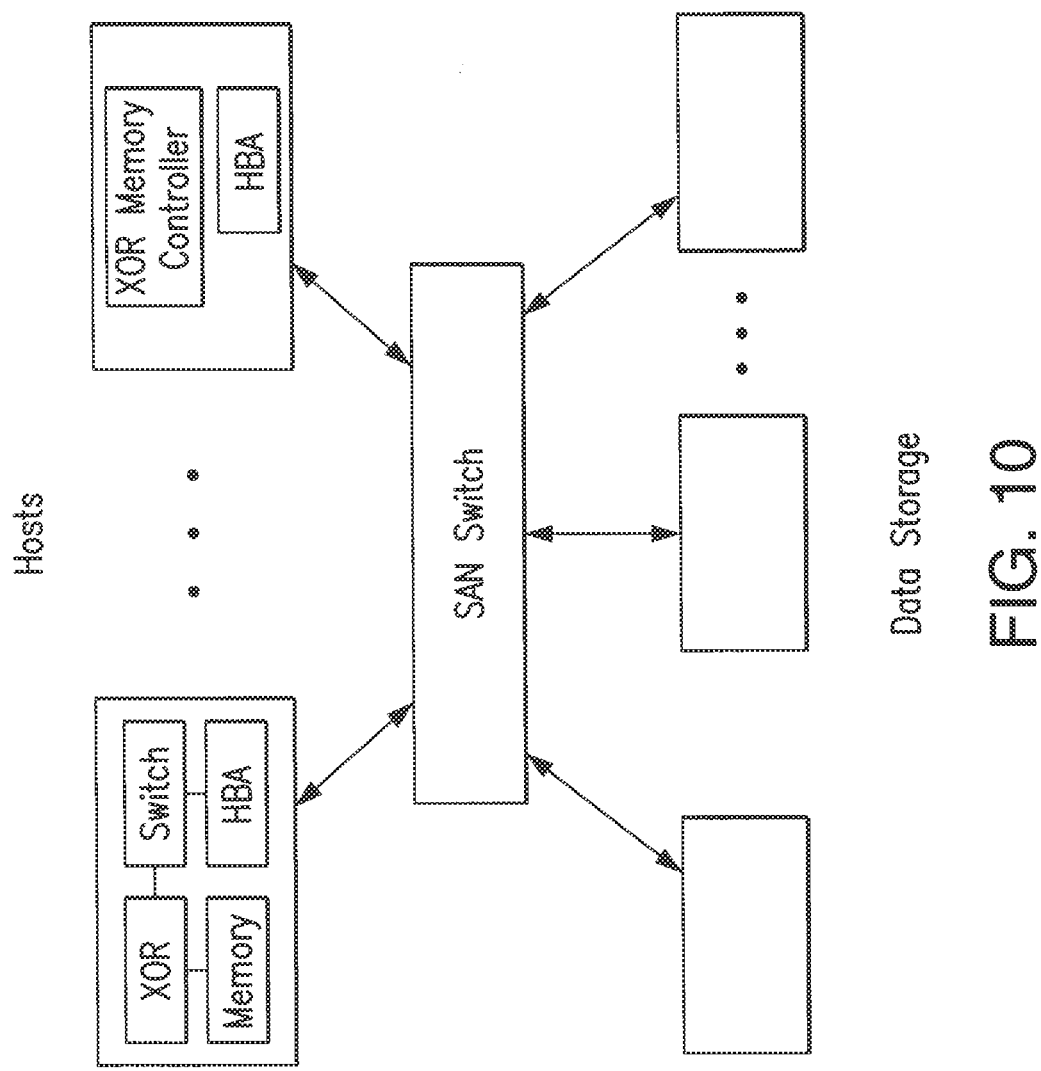
FIG. 10 is a data storage system of the present invention with the XOR memory controller embedded in host HBA.

FIG. 10 represents another alternative embodiment of the data storage system of the present invention with the XOR memory controller embedded in host HBA (host bus adapter). This system has host port bandwidths of N+P, where N is a stripe size, and P is a parity/block size, and where the storage port bandwidth is P, where P is a parity/block size. This embodiment attains a tight integration with host system and software, can scale linearly with addition of more HBAs, can be used with any type of storage network, and with any type of storage device, and data can be pushed from the HBA out to storage devices. The memory for XOR is not shared.

It is contemplated that the XOR memory controller can be integrated into existing FPGAs. Specifically, the XOR logic function unit 60 can reside within the FPGA. This arrangement allows the FPGA to perform the XOR "write" operation at the same speed as the "read" operation.

Figure 11:
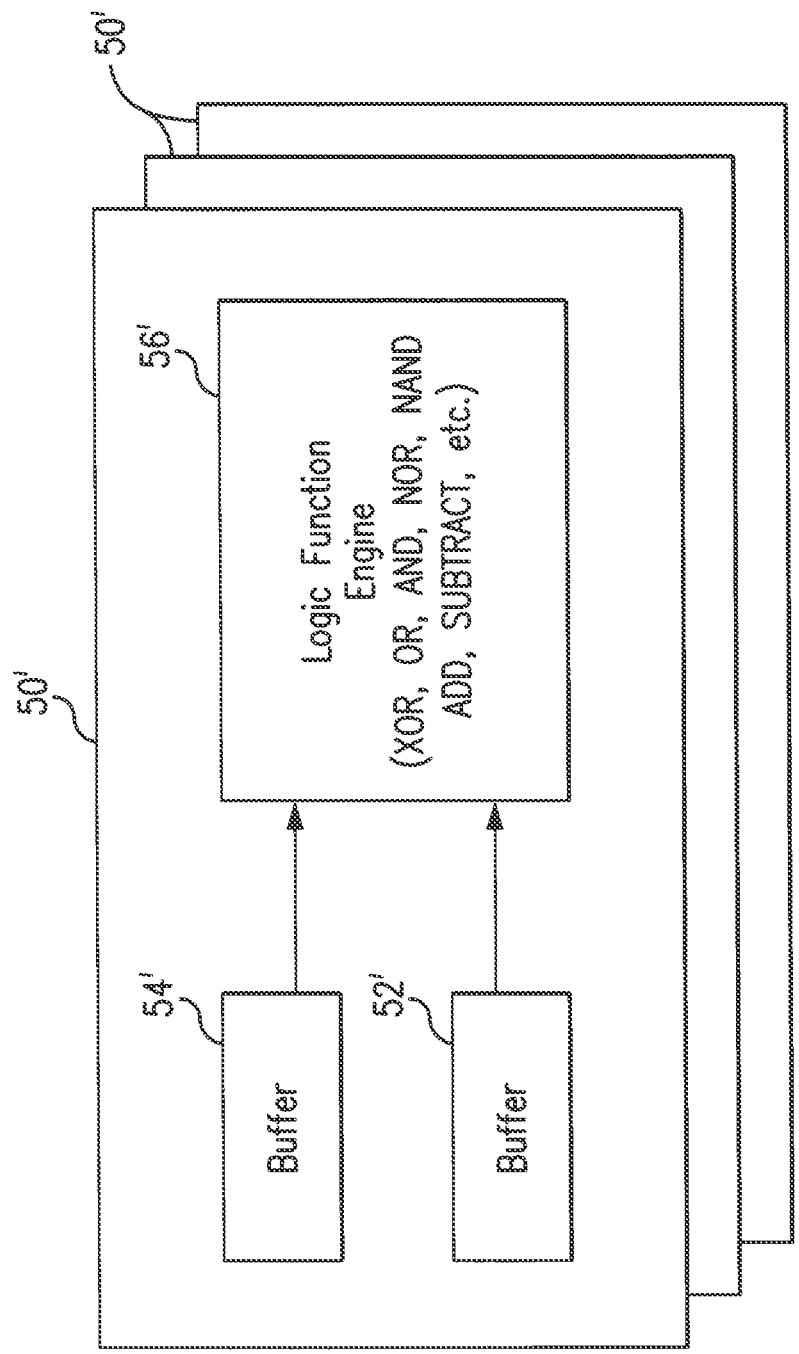
FIG. 11 is a schematic representation of the logic function units of the memory controller adapted for logic operations, such as, for example, XOR, OR, AND, NOR, NAND, ADD, SUBTRACT, etc.

It is also contemplated in the present invention, that, in addition to XOR, other logic operations on data, such as OR, AND, NOR, NAND, ADD and SUBTRACT, etc., may be embedded in the memory controller 38, when required by the application. Referring to FIG. 11, a logic function unit 50' of the subject memory controller includes a logic function engine 56' which can compare data received from buffers 52' and 54' in any manner, including OR, AND, NOR, NAND, ADD, SUBTRACT, etc., logic calculations, in addition to, or instead of, XOR logic calculations.

The present structure requires the memory interface to be only 2× the data transfer rate in comparison with 3× (+2× the parity) of the traditional RAID engine using CPU for XOR calculation.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A method for data migrating in a data storage system, comprising the steps of:
   (a) embedding an XOR (Exclusive OR) logic function unit into a memory controller, thereby creating an XOR memory controller, wherein said XOR logic function unit includes a first buffer, a second buffer, and an XOR comparator coupled to said first and second buffers,
   (b) coupling said XOR memory controller between at least one host and a memory unit,
   (c) allocating a first memory address range and a second memory address range,
   (d) receiving a "write" data request from at least one host, said write data request having a requested address associated therewith, wherein said "write" data includes a first data block and at least one second data block,
   (e) decoding said requested address,
   (f) placing, under control of said XOR memory controller, said first data block into said first buffer at an address range corresponding to said first memory address range in accordance with said decoded requested address,
   (g) transferring, under control of said XOR memory controller, said first data block to an address range in said memory unit corresponding to said first memory address range,
   (h) placing, under control of said XOR memory controller, said at least one second data block into said first buffer at an address range corresponding to said second memory address range,
   (i) transmitting, under control of said XOR memory controller, said first data block from said memory unit into said second buffer,
   (j) applying, under control of said XOR memory controller, the XOR logic function to said first data block and said second data block written in said first and second buffers, respectively, thereby generating a first XOR result, and
   (k) placing, under control of said XOR controller, said first XOR result into said address range in said memory unit corresponding to said first memory address range.

2. The method of claim 1, wherein said "write" data includes a plurality n of data blocks, and subsequent to the step (k), further comprising the steps of:
   (l) writing, under control of said XOR controller, a third data block in said "write" data into said first buffer at said address range corresponding to said second memory address range,
   (m) transmitting, under control of said XOR controller, said first XOR result from said memory unit into said second buffer,
   (n) applying, under control of said XOR controller, XOR logic function to said third data block and said first XOR result written in said first and second buffers, thereby generating a second XOR result, and (o) placing, under control of said XOR controller, said second XOR result into said address range in said memory unit corresponding to said first memory address range; and (p) repeating, under control of said XOR controller, said steps (l)-(o) for subsequent data blocks in said "write" data until said n data blocks have been XOR-ed, thereby generating a parity XOR data for the entire "write" data.

3. The method of claim 2, further comprising the steps of: coupling a PCIe switch between said at least one host and said XOR memory controller,
coupling a storage array to said PCIe switch; and
upon receiving said "write" data request at said PCIe switch, transmitting, in said steps (f), (h), and (l), said "write" data to said storage array and mirroring the same to said XOR memory controller.

4. The method of claim 3, further comprising the steps of: sending a request to said storage array to read said parity XOR data from said memory unit.

5. The method of claim 3, wherein said XOR memory controller includes a DMA (Direct Memory Access) unit at an interface with said PCIe switch, further comprising the step of:
pulling said "write" data from said at least one host.

6. The method of claim 3, further comprising the steps of: integrating said XOR memory controller with each storage device in said storage array.

7. The method of claim 1, wherein said first and second memory address ranges are logical address ranges, further comprising the step of:
mapping said first and second logical memory address ranges respectively to respective physical addresses in said memory unit and said first and second buffers.

8. The method of claim 7, further comprising the step of: performing the step of memory address mapping in accordance with a type of operation performed, said type of operation being selected from a group consisting of: "read", "write", "XOR read", and "XOR write".

9. The method of claim 1, wherein said XOR memory controller includes a plurality of XOR logic function units, further comprising the steps of:
while reading data from said memory unit at said second buffer of said at least one of said plurality of XOR logic function units,
receiving said "write" data from said at least one host at said first buffer of at least another of said plurality of XOR logic function units.

10. The method of claim 9, further comprising the steps of: coupling a multiplexer between said plurality of XOR logic function units and said memory unit, and
transmitting said XOR results to said memory unit through said multiplexer in a coordinated fashion.

11. The method of claim 10, further comprising the steps of:
coupling an ECC (Error Correction Code) generator unit between said multiplexer and said memory unit, and
protecting said XOR results transferred to said memory unit from errors by applying said ECC procedure thereto; and
coupling an ECC (Error Correction Code) checker unit between said memory unit and said second buffer, and
protecting said XOR data transferred from said memory unit to said second buffer from errors by applying the ECC generation and ECC checking procedures thereto.

12. The method of claim 1, wherein said storage system is a RAID (Redundant Array of Independent Drives) system.

13. The method of claim 1, further comprising the steps of: integrating said XOR memory controller with said at least one host, and
pushing data from a host bus adapter of said at least one host.

14. A data storage system, comprising:
a memory controller having at least one XOR logic function unit embedded therein,
a first buffer, a second buffer, an XOR comparator coupled, by inputs thereof, to outputs of said first and second buffers residing at said at least one XOR logic function unit,
a first memory unit coupled to said at least one XOR logic function unit through communication channels extending between said first memory unit and said first and second buffers, and an output of said XOR comparator, respectively,
a second memory unit having a first address range and a second address range,
a "write" data request received from at least one data generating entity, and supplied to said XOR memory controller, said "write" data request having an address request associated therewith, wherein said "write" data request includes a plurality n of data blocks,
wherein said XOR memory controller is configured to
(a) place a first data block from said plurality n thereof into said first buffer using said first address range,
(b) transfer said first data block to said first memory unit using said first address range,
(c) place a second data block from said plurality n thereof into said first buffer using said second address range,
(d) transmit said first data block from said first memory unit into said second buffer,
(e) apply logic function to said first data block and said second data block, thereby generating a first XOR result,
(f) place said first XOR result into in said first memory unit using said first address range,
(g) place a third data block in said "write" data into said first buffer using said second address range,
(h) transmit said first XOR result from said first memory unit into said second buffer,
(i) apply XOR logic function to said third data block and said first XOR result, thereby generating a second XOR result,
(j) place said second XOR result into in said first memory unit using said first address range, and
(k) repeat said functions (g)-(j) for subsequent data blocks in said "write" data until said n data blocks have been XOR-ed, thereby generating a parity XOR data for the entire "write" data.

15. The system of claim 14, wherein said second memory unit is a virtual memory, further comprising a Memory Management Unit operatively coupled between said virtual memory and said first memory unit to perform memory mapping therebetween in correspondence with a type of operation performed.

16. The system of claim 15, wherein said at least one XOR logic function unit further includes a second Multiplexer coupled between outputs of said first and second buffers and said XOR comparator, and wherein said Memory Management Unit including an Address Decode and Control Unit receiving, at an input thereof, said address request, and coupled, by an output thereof, to said second Multiplexer.

17. The system of claim 16, wherein said Address Decode and Control Unit further is coupled to PCIe interface to receive a signal corresponding to the type of operation, and generates a memory mapping control signal transmitted to said second Multiplexer.

18. The system of claim 16, further including:
an ECC (Error Correction Code) generator unit coupled between said Multiplexer and said first memory unit for protecting said XOR results transferred to said first memory unit from errors, and
an ECC (Error Correction Code) checker unit coupled between said first memory unit and said second buffer for protecting said XOR data transferred from said first memory unit to said second buffer from errors.

19. The system of claim 14, further including a PCIe switch coupled between said at least one host and said XOR memory controller, wherein said PCIe switch is configured, upon receiving said "write" data request, to mirror said "write" data, to generate a first and second copies of said "write" data, and
to transmit said first copy of said "write" data to said XOR memory controller.

20. The system of claim 19, further including:
a storage array coupled to said PCIe switch, wherein said second copy of said "write" data is transmitted to said storage array for being written thereinto;
where said storage array includes storage devices selected from a group consisting of: disk drives, and solid-state memory devices; and
wherein, upon the parity XOR data has been calculated in said XOR memory controller, said parity XOR data is transmitted to said storage array.

21. The system of claim 20, wherein said XOR memory controller is integrated with each of storage devices in said storage array.

22. The system of claim 19, wherein said XOR memory controller includes a plurality of XOR logic function units configured to read data from said first memory unit to said second buffer of said at least one of said plurality of XOR logic function units, while receiving said "write" data from said at least one host at said first buffer of at least another of said plurality of XOR logic function units; and
a first Multiplexer coupled between said plurality of XOR logic function units and said first memory unit, and configured to transmit said XOR results to said first memory unit through said multiplexer in a coordinated fashion.

23. The system of claim 14, wherein said XOR memory controller is integrated with said at least one host for pushing data from a host bus adapter.

24. The system of claim 14, wherein said XOR memory controller is Double Data Rate memory controller.

25. The system of claim 14, wherein said XOR memory controller is a SRAM memory controller.

26. The system of claim 14 wherein said XOR memory controller is a Flash memory controller.

27. A data storage system, comprising:
a memory controller, said memory controller including:
at least one logic function unit embedded therein,
wherein said at least one logic function unit includes:
a first buffer,
a second buffer, and
a logic function engine coupled, by inputs thereof, to outputs of said first and second buffers residing at said at least one logic function unit;
a memory unit coupled to said at least one logic function unit through communication channels extending between said memory unit and said first and second buffers, and an output of said logic function engine, respectively,
wherein said memory unit, and said first and second buffers, have a first address range and a second address range allocated thereat,
wherein said memory controller is configured to:
(a) place a first data block into said memory unit using said first address range,
(b) place a second data block into said first buffer using said second address range,
(c) transmit said first data block from said first address range in said memory unit into said second buffer,
(d) apply said logic function engine to said first data block and said second data block, thereby generating a logic result; and
(e) place said logic result into said first address range in said memory unit.

28. The data storage system of claim 27, wherein said at least one logic function is an XOR logic function.

29. The data storage system of claim 27, wherein said at least one logic function is selected from a group consisting of OR and AND logic functions.

30. The data storage system of claim 27, wherein said at least one logic function is selected from a group consisting of NOR and NAND logic functions.

31. The data storage system of claim 27, wherein said at least one logic function is selected from a group consisting of ADD and SUBTRACT logic functions.

32. The data storage system of claim 27, wherein said at least one logic function performs comparison of at least two data.

* * * * *